United States Patent [19]

Cotter

[11] Patent Number: 5,480,128

[45] Date of Patent: Jan. 2, 1996

[54] GAS SPRING WITH THREADED MOUNT AND METHOD OF PRODUCING THE SAME

[75] Inventor: Patrick J. Cotter, Plymouth, Mich.

[73] Assignee: Diebolt International, Inc., Detroit, Mich.

[21] Appl. No.: 369,689

[22] Filed: Jan. 6, 1995

[51] Int. Cl.$^6$ ............................................. F16F 9/34
[52] U.S. Cl. ........................ 267/64.11; 188/322.19; 92/161; 267/119; 267/130
[58] Field of Search .......................... 267/119, 130, 267/64.11, 124, 120, 64.13, 64.26; 92/161; 248/74.3, 74.1, 74.4, 315; 285/417, 399, 919; 29/428; 188/322.19

[56] References Cited

U.S. PATENT DOCUMENTS

| | | | |
|---|---|---|---|
| 3,511,136 | 5/1970 | Thomas et al. | 92/161 |
| 3,799,530 | 3/1974 | Stembridge | 267/130 |
| 3,947,005 | 3/1976 | Wallis | 267/119 |
| 4,342,448 | 8/1982 | Wallis | 267/119 |
| 4,628,796 | 12/1986 | Wallis | 267/119 |
| 4,700,616 | 10/1987 | Stoll et al. | 92/161 |
| 4,765,227 | 8/1988 | Balazs et al. | 267/119 |
| 5,237,909 | 8/1993 | Pirhadi | 92/161 |
| 5,275,387 | 1/1994 | Cotter et al. | 267/64.11 |
| 5,303,906 | 4/1994 | Cotter et al. | 267/64.11 |
| 5,386,975 | 2/1995 | Wallis | 267/119 |

*Primary Examiner*—Douglas C. Butler
*Attorney, Agent, or Firm*—Barnes, Kisselle, Raisch, Choate, Whittemore & Hulbert

[57] ABSTRACT

A gas spring with an elongate tubular casing having a chamber for containing a gas under pressure therein. The casing has an opening at one end and an annular groove around the outer circumference. A piston rod projects from the casing through the opening and is connected to a piston disposed within the chamber for compressing the gas therein. A mounting sleeve is telescoped over the casing and has exterior threads thereon. The sleeve has an internal annular groove which coincides with the groove in the casing forming a passage between the sleeve and the casing. The sleeve is secured to the casing by a lock ring formed in the passage by injecting a resin into the passage and allowing it to cool and solidify. Holes are formed through the sleeve opening into the passage. Some permit resin to be injected into the passage through the holes and some permit resin to flow from the passage into the holes. The resin material in the holes is trimmed to the radially outer tip of the threads leaving excess resin material between some of the threads. This excess material acts as a thread locking element when the gas spring is installed into a die.

13 Claims, 1 Drawing Sheet

GAS SPRING WITH THREADED MOUNT AND METHOD OF PRODUCING THE SAME

FIELD OF THE INVENTION

This invention relates to gas springs, and more particularly, to the mounting of gas springs in dies and the like.

BACKGROUND OF THE INVENTION

A typical gas spring has a cylindrical casing precharged with a gas, a reciprocable rod protruding from one end connected to a piston disposed within the casing for compressing the gas therein. Gas springs may be employed to aid in the removal of a work piece from a stamping die. The work piece may be lifted out of the forming die after stamping operations have been performed thereon by a low reaction force gas spring mounted in the die. When the dies are open, the rod of the gas spring projects from the die cavity and contacts the work piece. When the dies are closed, the rod is compressed as the force of the stamping operation is exerted on the work piece. As the dies open again, the rod of the gas spring pushes against the work piece thereby lifting the work piece from the die cavity. This helps facilitate removal and transfer of the work piece from one stage of the forming process to the next via robots or mechanical actuators. Depending on the need at each stage of the stamping operation, the gas spring force may be varied by adjusting the depth to which the gas spring is inserted into the die. The longer the stroke of the rod, the higher the force exerted by the gas spring on the work piece.

Gas springs of this type are either clamped or threaded into a die. A gas spring to be clamped into a die normally has a clamp ring groove in the outer circumference of the casing. A gas spring that is to be threaded into a die normally has integral threads formed on the external surface of the casing. The threaded type typically requires a lock nut to secure it in the die. It is difficult to provide clearance in the die for a lock nut that is to be received on the gas spring. If the lock nut is recessed, it is difficult to reach making adjustment and removal of the gas spring more difficult.

SUMMARY OF THE INVENTION

A gas spring embodying this invention has an externally threaded mounting sleeve with an internal annular groove telescopically received over a tubular casing with an external clamp ring groove aligned with and opening into the sleeve groove to provide a passage in which a lock ring of resin material is received to secure the mounting sleeve to the casing. Preferably, after the sleeve is telescoped over the casing, the annular lock ring is formed by molding the resin in the passage. Preferably, the lock ring is injection molded in the passage by injecting the resin through one or more gate holes in the sleeve opening into the passage. Preferably, to retard unintentional rotation of the gas spring when threaded in a die, the material injected through the gate holes is trimmed to the radially outer tip or extent of the threads leaving some resin material between the threads. Preferably, the sleeve is in the form of a cup with an integral end having a diametrical slot or other recess for engagement by a tool to rotate the threaded sleeve and a central clearance hole through which the rod of the gas spring projects. Preferably, to accurately align the grooves in the sleeve and casing, the end of the sleeve bears on an adjacent end of the casing.

This threaded mounting sleeve and lock ring construction permits a gas spring with a clamp ring mounting groove and no threads to be readily converted to a gas spring with a threaded mount. This eliminates the need for a separate casing, greatly reduces the manufacturing inventory of component parts and assembled gas springs and provides a particularly economical gas spring with a threaded mount. When the gas spring is installed in a threaded die bore, unintentional rotation is prevented by the resin material left within the sleeve threads forming a locking element frictionally bearing on the threaded die bore. This eliminates the need for a separate lock nut or a second operation necessary to lock the gas spring in place.

Objects, features and advantages of this invention are to provide a gas spring with a threaded mount which can be readily produced utilizing a gas spring with a clamp ring groove, substantially decreases the inventory of component parts and assemblies which must be maintained to manufacture and supply gas springs with both clamp ring and threaded mounts, provides a thread locking element integrally with the gas spring, eliminates the need for a separate lock nut or secondary operation to secure the gas spring in place, and is rugged, durable, reliable, of simplified design, economical manufacture and assembly and has in service a long useful life.

BRIEF DESCRIPTION OF THE DRAWINGS

These and other objects, features and advantages of this invention will be apparent from the following detailed description of the best mode, appended claims and accompanying drawings in which:

DETAILED DESCRIPTION OF THE PREFERRED EMBODIMENT

Figure 1:
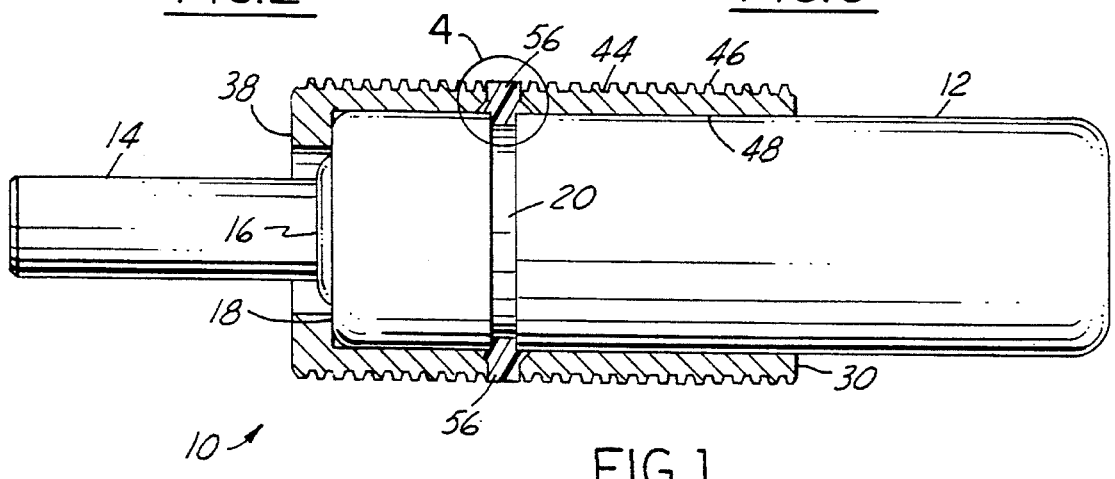
FIG. 1 is a side view of a gas spring assembly according to this invention shown with its mounting sleeve cut away and in section.

FIG. 1 illustrates a gas spring 10 embodying this invention with an elongate tubular casing 12 with a chamber therein for containing a gas under pressure. A piston rod 14 is received within the chamber and projects from the casing 12 through an opening 16 in one end 18 of the casing. The rod 14 is connected to a piston (not shown) disposed within the chamber for compressing the gas therein. The casing 12 also has a recessed annular groove 20 extending around the outer circumferential surface. As thus far described, preferably the gas spring 10 has the construction and arrangement shown and described in U.S. Pat. No. 5,303,906 the disclosure of which is incorporated herein by reference.

Figure 2:
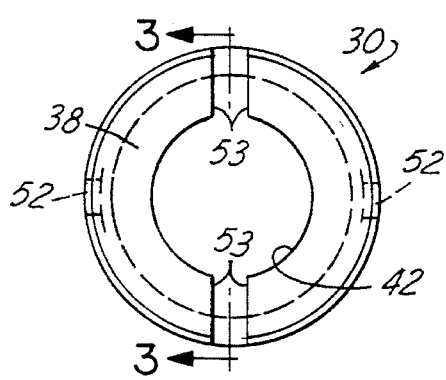
FIG. 2 is an end view of the sleeve.
Figure 3:
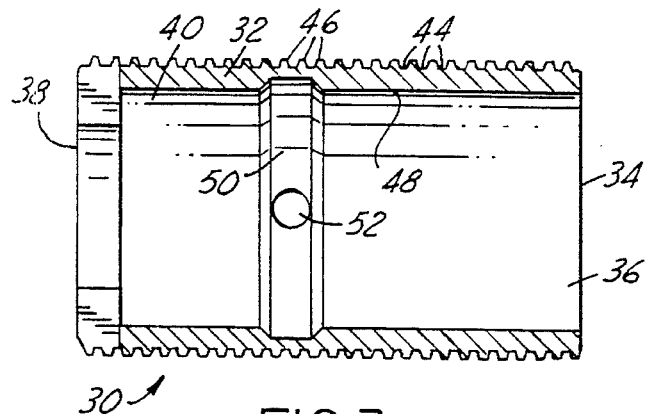
FIG. 3 is a sectional view of the sleeve taken along line 3—3 in FIG. 2.

As shown in FIGS. 1–3, a mounting sleeve 30 is telescoped over the casing 12 and overlaps the casing groove 20. The sleeve 30 has a generally cylindrical tubular body 32 with an internal diameter substantially the same as the outside diameter of the casing 12 and an opening 34 at one end 36 of the body 32 for receiving the casing 12 therein. The sleeve 30 also has an end wall 38 at the other end 40 of the body 32 with a central hole 42 providing clearance for the rod 14.

The exterior surface 44 of body 32 has external threads 46 thereon for adapting the casing 12 to a threaded mounting configuration. The interior surface 48 of the body 32 has a recessed annular groove 50 therein extending around the circumference of the surface 48. Two gate holes 52 are bored radially through the body 32 of the sleeve 30 so as to open into the sleeve groove 50 for providing direct communication between the groove and the exterior of the body. Preferably, two diametrically opposed recesses or slots 53 are disposed in the wall 38 for engagement by a tool used to install and remove the gas spring 10 in a die.

Figure 4:
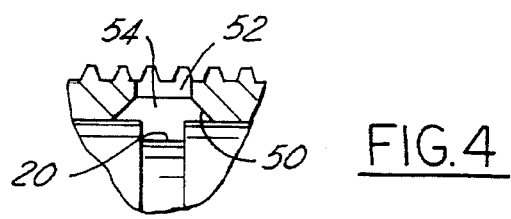
FIG. 4 is an enlarged view of that portion of the gas spring of FIG. 1 enclosed by circle 4 illustrating its lock ring passage and gate hole with no lock ring material therein.

In assembly, the sleeve groove 50 is aligned with the casing groove 20 to form a passage 54 around the gas spring 10, as shown in FIG. 4. Preferably, to facilitate alignment of the grooves 20 and 50 during assembly, the sleeve is constructed so that the grooves are aligned when the sleeve wall 38 bears on the adjacent end 18 of the casing. To retain the sleeve 30 on the casing 12, a lock ring 56 is disposed within the passage 54. The lock ring 56 is formed of a plastic or resin material of a type having sufficient strength to withstand the shear forces applied between the casing 12 and the sleeve 30 during installation of the gas spring assembly into the die and preferably during operation of the dies. The holes 52 are filled with resin material through the sleeve 30 to the radially outer tip or extent of the threads 46 for providing a thread locking element for the gas spring when installed.

To make the gas spring assembly shown in FIG. 1, the casing 12 is inserted into the opening 34 of the sleeve 30. The sleeve 30 is telescoped over the casing 12 until the wall 38 abuts the adjacent end 18 of the casing 12. As shown in FIG. 4, this aligns the groove 50 with the groove 20 and in cooperation they form the passage 54 between the casing 12 and the sleeve 30. Preferably, a thermosetting resin in a liquid state is injected under elevated pressure and temperature through the gate holes 52 into the passage 54. The holes 52 are preferably diametrically opposed to provide shorter flow paths for the liquid resin. This reduces the injection pressure necessary to inject the resin and prevents premature cooling of the resin thereby preventing void spaces within the ring 56. The resin material is then cooled to form a solid lock ring 56. The excess material or sprue projecting from the gate holes 52 is then trimmed, leaving thread locking material within and between some of the sleeve threads. If desired, additional holes 52 (not shown) may also be formed through the sleeve 30 and opening into the groove 50. These holes, though not used as injection gate holes, will be filled with molten resin flowing from within the passage 54 and when solidified and cooled provide additional resin material within the sleeve threads for increased thread locking.

The lock ring is received into both the casing groove 20 and the sleeve groove 50 to lock or secure the sleeve to the casing. Preferably, the lock ring is circumferentially continuous. In use, the gas spring 10 is typically installed in a die having a threaded blind bore. A tool is used to engage the diametric slots 53 and when rotated, the threads in the sleeve engage the threads in the blind bore to receive and mount the gas spring in the die. To install, adjust or remove the gas spring from the die, the tool is used to engage the diametric slots 53 and when rotated in the desired direction, the gas spring can be installed, adjusted or removed from the blind bore in the die. As the gas spring is installed into a threaded bore in a die, the material left in the holes 52 between the sleeve threads is forced into engagement with the die hole threads providing the thread locking feature preventing unintended rotation in use of the gas spring.

What is claim is:

1. A gas spring comprising, an elongate tubular casing having a chamber therein for containing gas under pressure and an annular side wall having an annular groove around the outer circumference of said casing, a rod received in said casing and projecting from one end of said casing, a piston within said chamber connected to said rod for axial movement therewith, a sleeve telescoped over said casing and having a wall with external threads thereon and an internal annular groove around the inner circumference of said sleeve and constructed and arranged to align with said annular groove in said casing to form a passage defined by said annular grooves, and a lock ring of resinous material received in said passage for retaining said sleeve on said casing.

2. The gas spring according to claim 1 wherein said sleeve further comprises an end wall having a clearance hole permitting said rod to freely pass therethrough, said end wall bearing on said casing to align said annular grooves in said sleeve and said casing.

3. The gas spring according to claim 1 wherein said side wall of said sleeve further comprises at least one hole passing through said side wall and into said annular groove in said side wall of said sleeve.

4. The gas spring according to claim 3 wherein said ring of resinous material is injection molded into said passage through said hole.

5. The gas spring according to claim 4 wherein said resinous material injected into said passage through said hole fills said hole to substantially the radially outer extent of said threads.

6. The gas spring according to claim 3 having at least two of said holes.

7. The gas spring according to claim 6 wherein at least one of said holes has no resinous material injected therethrough into said passage and said resinous material fills said one hole to substantially the radially outer extent of said threads from within said passage.

8. The gas spring according to claim 4 wherein said resin is an injection moldable polyurethane resin.

9. The gas spring according to claim 1 wherein said sleeve is slidably received on said casing with a close fit.

10. A method of producing a gas spring having external mounting threads comprising:

a. providing a gas spring having an elongate cylindrical tubular casing with an annular groove opening to the exterior surface of said casing, b. providing a cylindrical sleeve having external threads and an internal annular groove opening to the interior of said sleeve with at least one hole through said sleeve opening into said annular groove of said sleeve, c. telescoping said sleeve over said casing so that said groove in said sleeve and said groove in said casing overlap one another forming an annular passage therebetween, d. filling said passage through said hole with a flowable resin, and e. allowing said resin to form a solid lock ring in said passage for retaining said threaded sleeve on said casing.

11. The method according to claim 10 wherein said resin is a thermosetting resin.

12. The method according to claim 10 wherein said resin is a liquid resin.

13. The method according to claim 10 wherein said resin fills said passage and forms a solid and continuous ring.

* * * * *